(12) United States Patent
West

(10) Patent No.: US 6,986,650 B2
(45) Date of Patent: Jan. 17, 2006

(54) FLUID PUMPING APPARATUS

(75) Inventor: Phillip B. West, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 0 days.

(21) Appl. No.: 10/989,876

(22) Filed: Nov. 15, 2004

(65) Prior Publication Data

US 2005/0100465 A1 May 12, 2005

Related U.S. Application Data

(62) Division of application No. 10/288,963, filed on Nov. 5, 2002, now Pat. No. 6,868,035.

(51) Int. Cl.
*F04B 17/03* (2006.01)

(52) U.S. Cl. .............................. 417/423.3; 417/423.1; 417/423.14; 222/95; 166/105; 166/107

(58) Field of Classification Search ............. 417/423.1, 417/423.14, 423.7, 423.3, 326; 222/95 X, 222/105; 166/107, 105 X, 253
See application file for complete search history.

(56) References Cited

U.S. PATENT DOCUMENTS

| | | | |
|---|---|---|---|
| 118,849 A | | 9/1871 | Ferriss |
| 2,942,555 A | * | 6/1960 | Pezzillo ..................... 417/372 |
| 3,220,350 A | * | 11/1965 | White ....................... 417/357 |
| 3,254,508 A | | 6/1966 | Garrett |
| 3,447,340 A | | 6/1969 | Garrett |
| 4,047,847 A | | 9/1977 | Oikawa |
| 4,434,863 A | | 3/1984 | Garrett |
| 4,726,746 A | * | 2/1988 | Takada et al. ........... 417/423.1 |
| 5,027,918 A | | 7/1991 | Cole |
| 5,060,751 A | | 10/1991 | Kuhlman et al. |
| 5,111,903 A | | 5/1992 | Meynier |
| 5,201,642 A | | 4/1993 | Hinckley |
| 5,255,245 A | | 10/1993 | Clot |
| 5,404,946 A | * | 4/1995 | Hess .......................... 166/187 |
| 5,579,653 A | * | 12/1996 | Sugiyama et al. ............ 62/508 |

(Continued)

OTHER PUBLICATIONS

Phillip B. West et al., "Clamping Systems for Large Downhole Seismic Sensor Arrays" Idaho National Engineering and Environmental Laboratory, Jun. 2001.

Dichenko et al., "Separating Device for the Sensing Element . . . ", Sep. 1982, Neft Khoz, No. 9, pp 58-61.

*Primary Examiner*—Charles G. Freay
*Assistant Examiner*—Emmanuel Sayoc
(74) *Attorney, Agent, or Firm*—Trask Britt, P.C.

(57) ABSTRACT

A method and apparatus suitable for coupling seismic or other downhole sensors to a borehole wall in high temperature and pressure environments. In one embodiment, one or more metal bellows mounted to a sensor module are inflated to clamp the sensor module within the borehole and couple an associated seismic sensor to a borehole wall. Once the sensing operation is complete, the bellows are deflated and the sensor module is unclamped by deflation of the metal bellows. In a further embodiment, a magnetic drive pump in a pump module is used to supply fluid pressure for inflating the metal bellows using borehole fluid or fluid from a reservoir. The pump includes a magnetic drive motor configured with a rotor assembly to be exposed to borehole fluid pressure including a rotatable armature for driving an impeller and an associated coil under control of electronics isolated from borehole pressure.

11 Claims, 6 Drawing Sheets

U.S. PATENT DOCUMENTS

| | | | |
|---|---|---|---|
| 5,601,419 A * | 2/1997 | Kobayashi et al. | 417/423.14 |
| 5,711,657 A * | 1/1998 | Hoffmeier | 417/319 |
| 6,065,946 A * | 5/2000 | Lathrop | 417/423.14 |
| 6,206,133 B1 * | 3/2001 | Paulsson | 181/102 |
| 6,230,557 B1 * | 5/2001 | Ciglenec et al. | 73/152.01 |
| 6,242,829 B1 | 6/2001 | Scarsdale | |
| 6,339,886 B1 | 1/2002 | Reinhardt | |
| 6,564,883 B2 | 5/2003 | Fredericks et al. | |
| 6,868,035 B2 * | 3/2005 | West | 367/25 |
| 2004/0035634 A1 * | 2/2004 | Rueter | 181/122 |

* cited by examiner

FLUID PUMPING APPARATUS

RELATED APPLICATION

This application is a divisional of application Ser. No. 10/288,963, filed Nov. 5, 2002, now U.S. Pat. No. 6,868,035.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

BACKGROUND OF THE INVENTION

1. Field of the Invention

The present invention relates generally to seismic sensors which are deployed within a fluid filled borehole of a well to monitor seismic waves. More particularly, the present invention relates to a method and apparatus suitable for coupling geophone sensors to a borehole wall in high temperature and pressure environments.

2. State of the Art

In borehole seismology, motion sensors are lowered into the borehole of a well to monitor seismic waves emitted from a seismic source placed within the borehole or at surface locations proximate thereto. The emitted seismic waves travel through the earth surrounding the borehole and under certain conditions are reflected and/or refracted by subterranean formations or variations in the surrounding strata. By recording the reflected and refracted seismic waves with the sensors it is possible to map the structural and compositional properties of the earth around the borehole. Such information is valuable, by way of example, to locate and determine the characteristics of oil and gas reservoirs during energy exploration.

In a typical configuration, an array of sensor modules containing geophone type sensors is lowered into the borehole on a cable called a wireline, also sometimes referred to as a logging cable. Alternatively, a tubing string may be used to deploy the array. The geophones operate via a component that measures displacement between a stationary first part and a second part mounted for movement along an axis in response to vibrations from the seismic waves. Often, the geophones are constructed as 3-component, or triaxial, sensors which are arranged to record in the vertical (Z) direction, as well as first and second (X and Y) horizontal directions, providing a reading for each of the three orthogonal components of the seismic waves. Due to the displacement measuring technique by which geophones sense seismic waves, a firm, uninterruptible interface between the geophones and the transmission medium for the seismic waves is required to receive the vibrations. Optimal performance may be accomplished by clamping or forcing a sensor module against a wall of a borehole to provide an improved mechanical coupling for conducting seismic waves to the associated geophone.

Various techniques have been used in the prior art in an attempt to maintain contact of a sensor module with a borehole wall. In one approach, extendable mechanical arms are incorporated into the sensor module. When the sensor module is positioned at a desired location within the borehole, the arms are extended from the module body to press against one or more surfaces of the borehole wall and clamp the sensing portion of the module against an opposite surface. For boreholes lined with metallic casings, as is often the situation with oil and gas wells, magnetic means have also been used to attach a sensor module to the borehole wall. Such systems are usually operated from a location, such as on a drilling rig floor, above the earth's surface and involve complicated attachment mechanisms that are sometimes incapable of effectively clamping in borehole regions having irregular shapes or surface topographies. Sensor modules of this type may also be mechanically complex, expensive to construct and add substantial extra weight, which must be carried by the wireline. As a sensor array may contain dozens or even hundreds of sensor modules the practical application for such costly and heavy devices is somewhat limited.

Another conventional coupling technique involves using an inflatable bladder or "packer" that is expanded in a borehole to force an associated sensor module into contact with a wall. U.S. Pat. No. 6,206,133 to Paulsson, U.S. Pat. No. 5,111,903 to Meynier and U.S. Pat. No. 5,027,918 to Cole disclosed common examples of inflatable bladder type sensor modules. While this inflatable bladder coupling approach is desirable in terms of construction, weight, and clamping versatility, the bladder structures raise other concerns with respect to performance under the hostile conditions frequently encountered within the confines of a deep well borehole. Typically, the bladders involved are formed of an elastomeric material such as a rubber, polyurethane or vinyl composition, and may be reinforced with one or more layers of flexible fabric such as polyester or nylon. The bladders are inflated with fluid under pressure which is supplied by tubing extending from the surface or from fluid reservoirs located on the sensor array. At great depths, especially when the fluid contained in the borehole comprises a dense slurry of particulates in a water or hydrocarbon-based drilling fluid (often referred to as "mud"), hydrostatic pressures may approach or even exceed levels of 25,000 psi. This environment requires that the inflation fluid pressure for the bladders be carefully controlled to assure adequate expansion without over-pressurization, which may burst the bladders. Furthermore, depending on the type of fluids residing within a borehole and the depth at which a sensor array is located, ambient temperatures may reach 500° F. (260° C.) or greater. At these temperature levels, the above-described bladder materials may be substantially damaged or degraded, rendering the bladders useless. Further, conventional bladders, particularly those located at substantial depths, are inflated by downhole pumping systems that commonly include a motor in a sealed housing filled with a nonconductive fluid and pressurized using a bladder or diaphragm. This approach equalizes pressure between the motor armature and borehole fluid, allowing the motor to drive an impeller with a shaft extending through a dynamic seal for pumping high pressure borehole fluid. The sealing of the motor and shaft is susceptible to leakage, and dynamic fluid pressures acting on the motor cause power losses and limit functionality in terms of speed and brush float, if the motor is so equipped.

As is evident from the foregoing description of the state of the art, a technique is needed for coupling sensors such as geophones to a borehole wall that overcomes the structural and durability problems associated with conventional approaches. More particularly, what is needed is a coupling system for use with sensor modules that is suitable for use in the extreme pressure and temperature conditions of a deep well borehole.

BRIEF SUMMARY OF THE INVENTION

In accordance with the present invention, a method and apparatus are disclosed wherein at least one expandable metal bellows is utilized to clamp a sensor module in position within a borehole and couple an attached seismic sensor to the borehole wall. By using metal bellows as the clamping mechanism, the simple construction, light weight and versatile clamping capabilities of a bladder-type coupler are afforded, while eliminating the shortcomings of conventional bladder structures and materials under high temperature and pressure conditions. One or more of the sensor modules incorporating the present invention are lowered into a borehole on a wireline or other suitable cable or tubing structure as part of a sensor array. Once positioned at a desired sensing location within the borehole, the at least one metal bellows is inflated to expand in a direction transverse to the longitudinal axis of the borehole at that location and clamp the sensor module in place by pressing it against an opposite surface or surfaces of the borehole wall.

In an exemplary embodiment of a sensor module according to the present invention, a bellows shoe is secured to the outer ends of a pair of metal bellows. The metal bellows are inflated to expand laterally from a first side of the sensor module and press the bellows shoe against a surface of the borehole wall, forcing the sensor module toward an opposite surface of the borehole wall where a fixed shoe secured to a second, opposing side of the sensor module is forced into contact with the opposite surface of the borehole wall, clamping the sensor module in place. A triaxial geophone is operably coupled to the bellows shoe and thus to the borehole wall for sensing seismic waves. When the sensing operation is complete, the metal bellows are deflated and contracted, unclamping the sensor module for longitudinal movement within the borehole. While described in terms of a sensor module having a triaxial geophone type sensor, other seismic sensors such as accelerometers or hydrophones are equally suited for use with the present invention.

In a further exemplary embodiment of the present invention, one or more metal bellows may be inflated with fluid supplied by a pump module lowered into the borehole with the sensor array. The pump module includes a magnetic drive pump using a novel magnetic drive motor which eliminates the problems of sealing and performance associated with other pumping systems. The magnetic drive motor comprises a ring of electromagnetic coils surrounding a static shell or other suitable structure surrounding a permanent magnet armature having an impeller attached thereto. Electronic controls sealed in a pressure-tight enclosure fire the electromagnetic coils in an orbital sequence which causes the armature and attached impeller to rotate. The inventive magnetic drive structure is more durable than the prior art pump motors, and removes the need for dynamic sealing about a shaft as there is no pressure differential between the permanent magnet armature and the impeller.

Advantageously, the pump module may use the borehole fluid itself to inflate the metal bellows. Borehole fluid may be drawn into an inlet in the pump module by the magnetically driven impeller, pressurized thereby and passed through an outlet to fill one or more metal bellows of one or more sensor modules included within the sensor array. If the fluid in the borehole is not suitable for inflating the metal bellows, a captive, clean, substantially incompressible fluid contained in a bladder-type reservoir in communication with the inlet of the pump module may be used instead. Under either arrangement, the structural and operational problems associated with supplying pressurized inflation fluid from a surface location are avoided.

Other and further features and advantages of the present invention will be apparent from the following detailed description taken in conjunction with the accompanying drawings. The following examples are provided for purposes of illustration only, and are not intended to be limiting. It will be understood by one of ordinary skill in the art that variations and combinations of the several elements and features of the embodiments presented herein are contemplated as being within the scope of the invention.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Referring in general to the accompanying drawings, various aspects and features are illustrated to show exemplary methods and apparatus for coupling seismic sensors to a borehole wall in accordance with the present invention. Common elements of the illustrated embodiments are designated with like reference signs. It should be understood the figures presented are not meant to be illustrative of actual views, but are merely idealized schematic representations which are employed to more clearly and fully depict the invention. It should further be understood that while described in terms of geophones deployed for the purpose of seismic surveying, any type of sensor deployed within a borehole to monitor seismic waves or which otherwise requires or benefits from secure contact with a borehole wall may benefit from use of the present invention.

Figure 1:
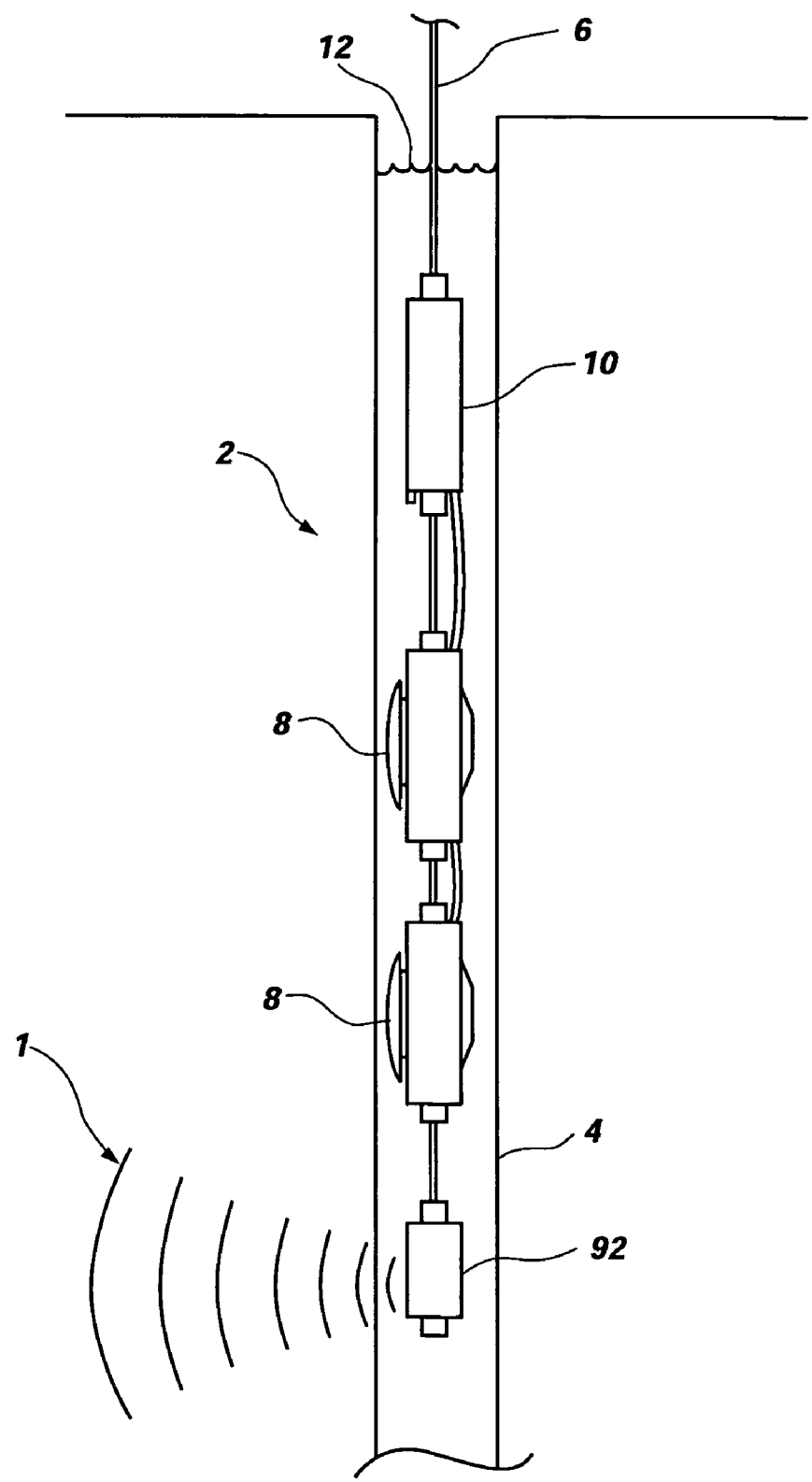
FIG. 1 is a partial cross-sectional, schematic side view of a sensor array according to the present invention deployed within a borehole.

FIG. 1 depicts an exemplary seismic surveying arrangement for detecting seismic waves 1 after relection from and refraction by subterranean formations wherein a sensor array 2 is deployed within a borehole 4 and comprises various components attached along a wireline 6 or other suitable cable or tubing structure. Components of sensor array 2 may include seismic wave emitters, sensors, pumps, wave suppression mechanisms or any device conventionally known for use in seismic surveying. With respect to the features of the present invention, sensor array 2 is depicted as including a plurality of sensor modules 8, pump module 10, and emitter 92. Of course, the number of sensor modules 8 and pump modules 10 is only exemplary, and any number of each may be provided on sensor array 2 based on factors such as the desired range and resolution for a survey. FIG. 1 also shows that borehole 4 is filled with borehole fluid 12, which in the case of wells for oil or gas exploration and production normally comprises a slurry of water- or hydrocarbon-based fluid. In other well applications, borehole fluid 12 may comprise a gas, a mixture of gases or even steam.

Figure 2:
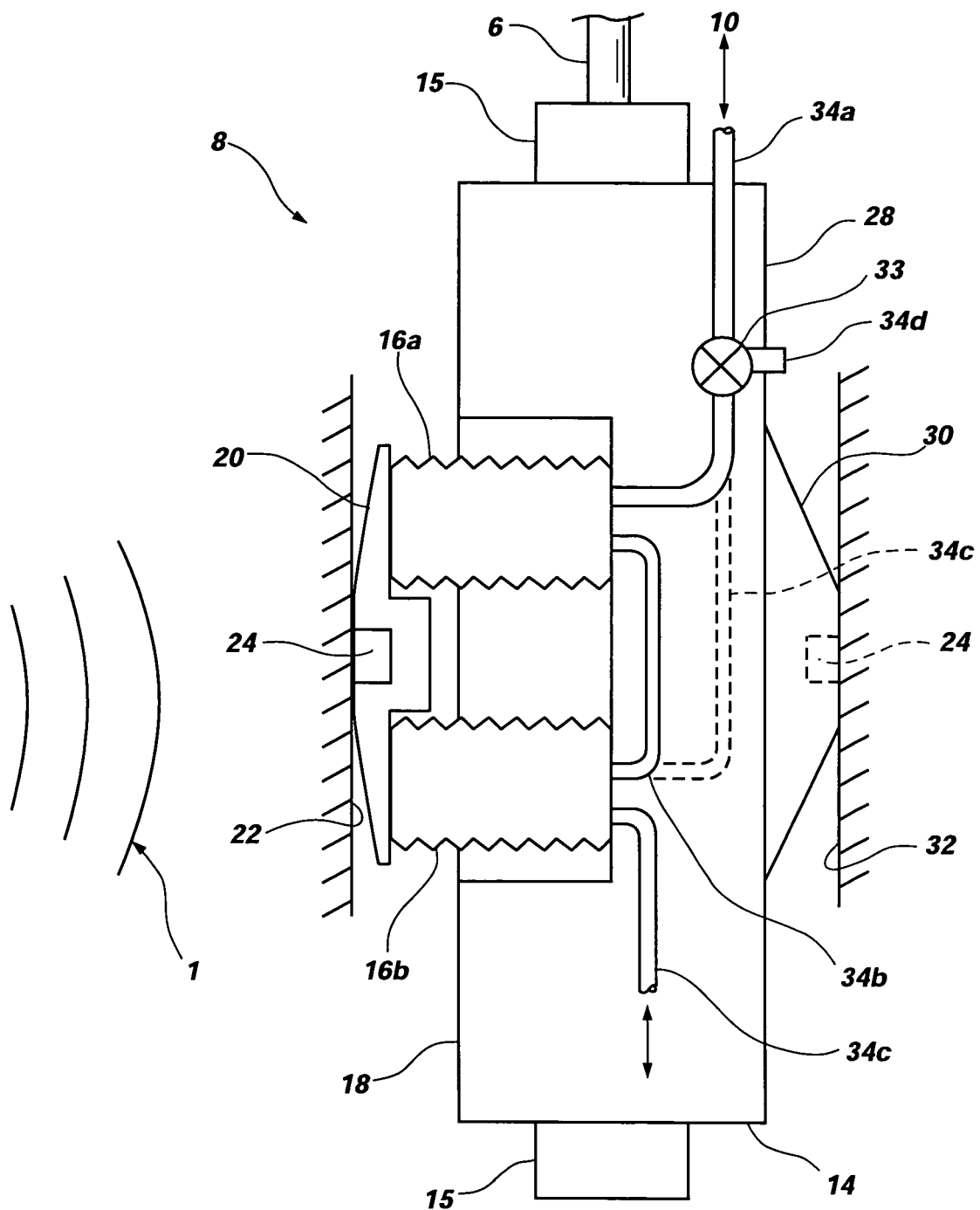
FIG. 2 is a schematic cross-sectional side view of an exemplary sensor module according to the present invention.

FIG. 2 shows a schematic cross-sectional side view of an exemplary sensor module 8 according to the present invention. Sensor module 8 is fabricated with housing 14, which may be substantially cylindrical or tubular in cross-section. Housing 14 is secured to wireline 6 at couplings 15 in a conventional manner. Metal bellows 16a and 16b are mounted within housing 14 in such a manner that, when inflated, they will expand from a first side 18 of sensor module 8 in a direction transverse to the longitudinal axis of borehole 4. A bellows shoe 20 is secured to the outer ends of metal bellows 16a and 16b, and acts as an engagement face for pressing against a borehole wall surface 22. As shown by FIG. 2, a seismic sensor in the form of triaxial geophone 24 is mounted in or to bellows shoe 20 at a mid-span position between metal bellows 16a and 16b. Conductive elements (not shown for clarity) are attached to geophone 24 and extend into and through the wall of housing 14 to provide electrical communication with the conductors of wireline 6. On a second side 28 of sensor module 8 a fixed shoe 30 is attached to housing 14 and acts as an engagement face for pressing against an opposite borehole wall surface 32. Alternatively or additionally, a seismic sensor as shown in broken lines 24 may also be mounted on or to fixed shoe 30.

Sensor module 8 is shown in FIG. 2 with metal bellows 16a and 16b inflated for clamping within borehole 4. In this position, bellows shoe 20 presses against borehole wall surface 22, effectively coupling geophone 24 thereto, while fixed shoe 30 presses against opposite borehole wall surface 32. Fluid pressure for inflation is provided by fluid supplied through supply conduit 34a from pump module 10 (see FIG. 1), described in further detail below. Metal bellows 16a and 16b may be deflated by evacuating fluid through supply conduit 34a for return to pump module 10. In FIG. 2, metal bellows 16a and 16b are shown as being connected in series via secondary conduit 34b. When additional sensor modules 8 are to be inflated with the same pump module 10, a further conduit 34c is arranged to pass fluid between adjoining sensor modules. Of course, other arrangements are possible within the scope of the invention. For instance, metal bellows 16a and 16b could be attached in a parallel arrangement using a "T" connection and secondary conduit 34c, or in some situations it might be desirable to include independent conduits for separately inflating metal bellows 16a and 16b to provide more precise control of the clamping of sensor module 8 and to accommodate irregularities in the borehole shape and surface topography.

In a further feature of the fluid supply arrangement, FIG. 2 also shows a shuttle valve 33 which may be included on conduit 34a to keep the fluid supply within the conduits and metal bellows at local pressure during deployment or retrieval of sensor module 8. When metal bellows 16a and 16b are deflated, supply and secondary conduits 34a and 34b or 34a and 34c (depending on the chosen system configuration) and the metal bellows 16a and 16b themselves will still contain an amount of fluid therein. As sensor module 8 is moved through borehole 4, the pressure of borehole fluid 12 will change in relation to its depth. This may generate a pressure differential or static head between the fluid still contained within the supply conduits and metal bellows 16a and 16b, and the borehole fluid 12. If the pressure differential is great enough, it may cause metal bellows 16a and 16b to expand and cause bellows shoe 20 to contact the wall of the borehole 4 and interfere with the longitudinal travel of sensor module 8 therethrough. Shuttle valve 33 acts in response to the presence or absence of a relatively large positive pressure differential between supply conduit 34 and borehole fluid pressure to compensate for this potential problem. When metal bellows 16a and 16b are deflated such that conduits 34a and 34b or 34a and 34c (depending on the chosen system configuration) exhibit low positive internal pressure relative to borehole fluid pressure, shuttle valve 33 remains in an open position to allow fluid at a relatively low positive pressure differential within the conduits to pass into the surrounding borehole fluid 12 through conduit 34d and thereby equalize pressure. When fluid is supplied for inflation by pump module 10, the relatively large positive internal pressure within supply conduit 34a forces shuttle valve 33 closed for inflation of metal bellows 16a and 16b. By way of example, the operation of shuttle valve 33 may be responsive to a spring (not shown) or other known biasing mechanism which holds the valve open until a desired pressure differential between the supply conduits and the borehole fluid pressure is exceeded. While depicted in FIG. 2 as being located inside sensor module 8 on conduit 34a, shuttle valve 33 might be located at any point on the conduits along sensor array 2. Furthermore, an independent shuttle valve 33 may be provided for each sensor module 8, or one shuttle valve 33 may be employed to equalize pressure for multiple modules. The number of valves required will depend in part on the number of sensor modules 8 driven by a single pump module 10, as well as the length of the conduits extending between sensor modules and the longitudinal distance and depth differential between the sensor modules, which will influence the amount of remaining fluid contained in the system and, thus, the potential static head. As an alternative to a shuttle valve, valve 33 may also comprise a positive-actuation valve that may be selectively closed and opened in concert with the expansion and contraction of bellows 16.

Figure 3:
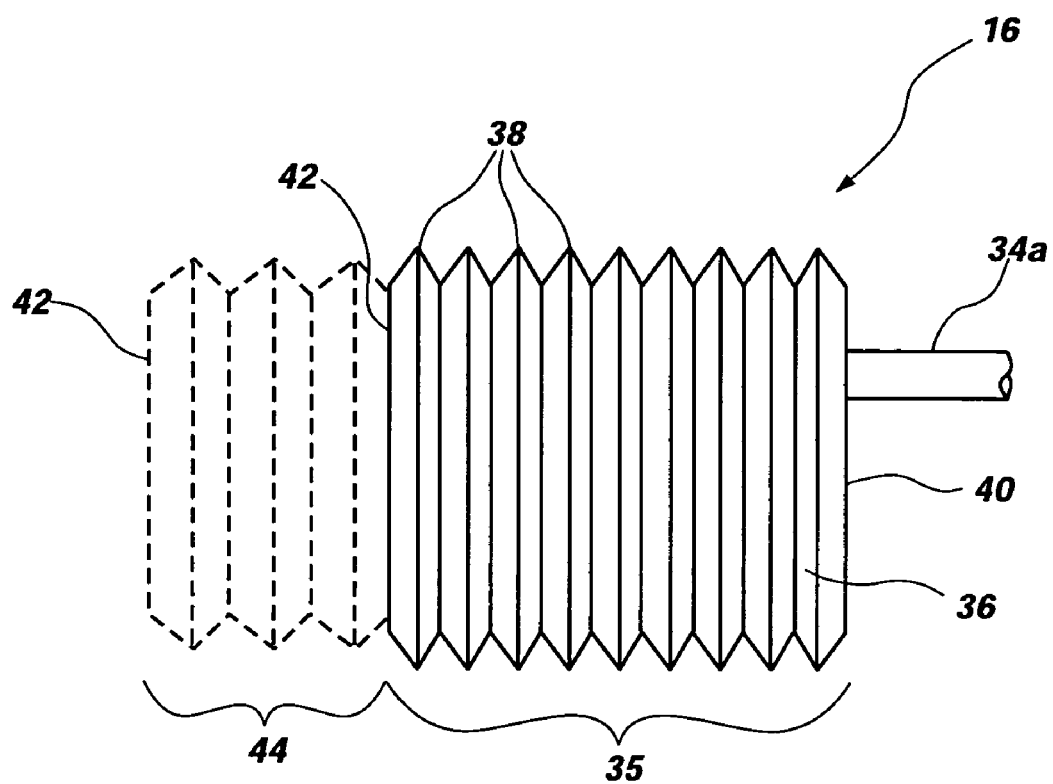
FIG. 3 is a side view of a metal bellows that is incorporated into the sensor module of FIG. 2.

FIG. 3 shows a more detailed view of a metal bellows 16 for the purposes of describing its operation. Metal bellows 16, shown in a noninflated state by solid lines 35 in FIG. 3, comprises a thin metal sheet 36 formed into a tube having a number of annular convolutions 38 formed along the length thereof. Metal bellows 16 may be formed by mechanically forming annular convolutions 38 in an extruded tube, a tube formed by seam-welding a sheet into a tube following by mechanical working, or by other techniques known in the art. Cross-sectional inner end 40 and outer end 42 of metal bellows 16 are closed off such that its interior is hermetically sealed from the outside environment and may be filled with fluid from conduit 34a for inflation. Inner end 40 and outer end 42 may each be covered and closed by a face integral with thin metal sheet 36, or by sealing to a separate structure such as a surface of bellows shoe 20 and a surface of housing 14 to which metal bellows 16 is attached in the present invention. Metal bellows 16 may be permanently sealed to bellows shoe 20 and housing 14 by conventional techniques such as welding or by using an adhesive, or may be removably attached by threads or use of a clamping structure in a pipe-fitting manner for ease of maintenance. Upon inflation using pressurized fluid, annular convolutions 38 are expanded longitudinally and force metal bellows 16 to an extended state, as shown by broken lines 44 in FIG. 3. By this operation, fluid pressure may be efficiently translated into linear motion for clamping sensor module 8 against the wall of a borehole. Upon removing fluid through supply conduit 34a by reversing pump 10 or merely bleeding pressure off through a selectively operable bleed valve into the surrounding borehole fluid to equalize pressure therewith, metal bellows 16 will contract back to its deflated state, uncoupling the assembly. As long as bellows 16 is not extended to a length causing plastic deformation thereof, the natural tendency of bellows 16 will be to return to a contracted state upon release of fluid pressure therefrom.

The range of expansion and contraction for metal bellows 16 is dependent upon the number of and peak to valley depth of annular convolutions 38 spaced along the length of thin metal sheet 36, as well as the material employed and the intended life of the metal bellows 16, which will limit the amount of allowed expansion for each convolution 38 based on fatigue failure. In a conventional borehole having a 6" to 8" diameter, for example, each metal bellows 16 may be selected, for example, to have a diameter of about two inches and to have nine convolutions to provide a desired range of expansion and contraction for clamping and unclamping while avoiding any substantial potential for cyclic fatigue failure over the life of the device. The relative range of expansion and contraction of metal bellows 16 may be an inch or less, and in many instances may be as little as about three-tenths of an inch. Thin metal sheet 36 may be formed of stainless steel as currently preferred, but may also be formed of other steel or copper alloys or even titanium. The type of metal used will depend on environmental conditions within borehole 4, the common desired characteristic being an ability to withstand higher temperatures than the prior art elastomeric bladder materials. However, other downhole environmental considerations such as the presence of carbon dioxide and sulfur dioxide, also termed "sour gas," may render one material more desirable than another for a particular application. Suitable bellows for incorporation into the present invention are available from commercial vendors such as Precision Bellows Mfg. of El Cajon, Calif., USA, Microflex, Inc. of Ormond Beach, Fla., USA or Senior Flexonics of Sharon, Mass. Accordingly, their features and methods of fabrication will not be described in any further detail.

Figure 4:
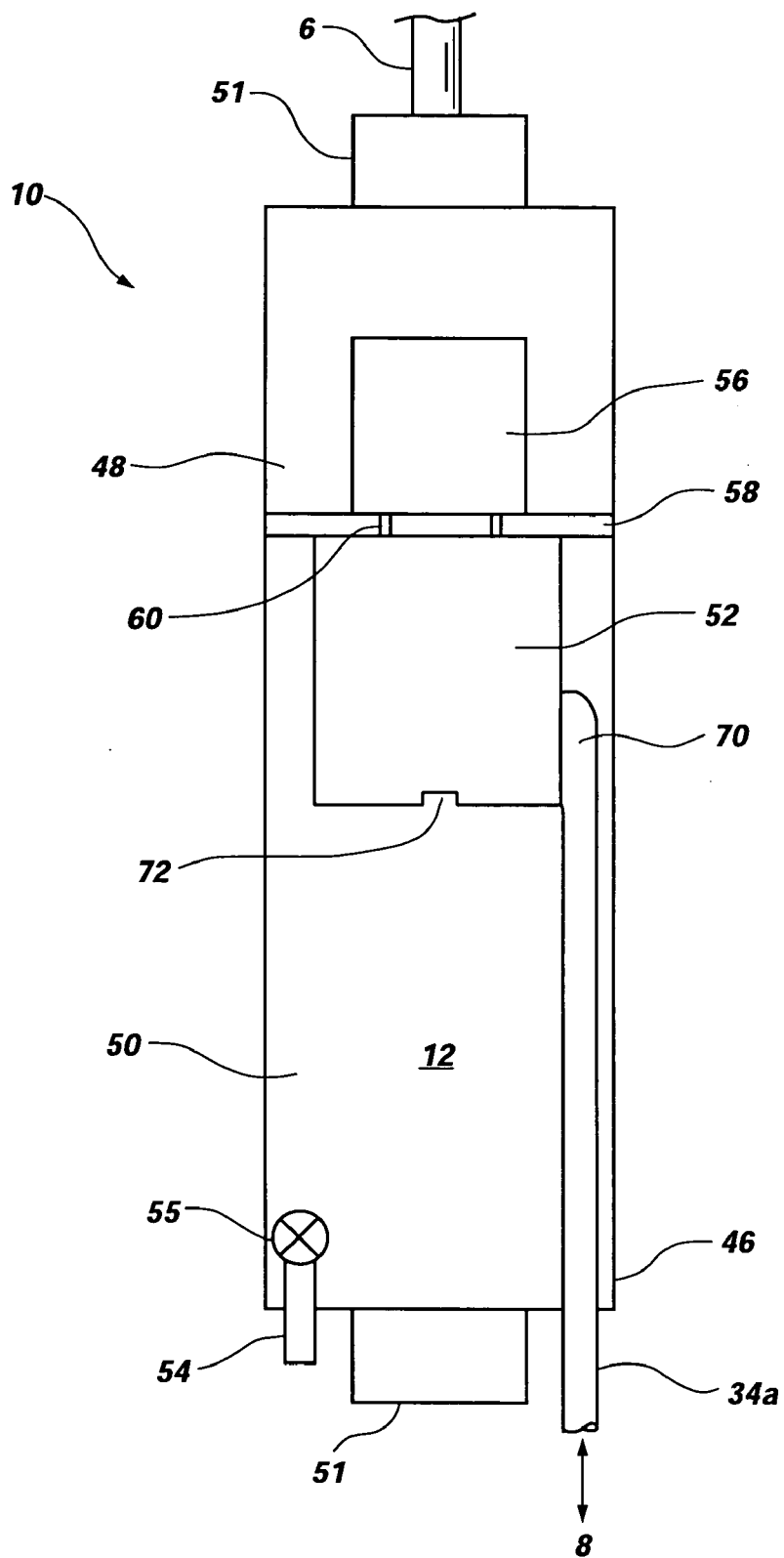
FIG. 4 is a schematic cross-sectional side view of an exemplary pump module according to the present invention.

In a further embodiment of the present invention, FIG. 4 shows a schematic cross-sectional side view of an exemplary pump module 10 according to the present invention. Similar to sensor module 8, pump module 10 may be fabricated with a housing 46 having a substantially cylindrical or tubular cross-section, and is divided into a top cavity 48 and a bottom cavity 50. Housing 46 is also secured to wireline 6 in a conventional manner at couplings 51. Bottom cavity 50 contains a magnetic drive pump 52, which may also be termed a "wet-rotor" pump, to provide the fluid under pressure for inflating metal bellows 16a and 16b. Power to magnetic drive pump 52 is preferably provided through wireline 6, although a downhole power source such as a fluid-driven turbine powered, for example, by circulation of drilling fluid may also be employed. As seen in FIG. 4, supply conduit 34a from sensor module 8 passes into bottom cavity 50 through the wall of housing 46 for communication with magnetic drive pump 52. Bottom cavity 50 further includes intake conduit or inlet 54 which terminates outside of housing 46 and provides a passageway for filling bottom cavity 50 with borehole fluid 12. Intake conduit 54 may include a bleed valve 55 therein which may be opened concurrently with commencement of operation of magnetic drive pump 52, closed when bellows 16a and 16b are inflated and expanded to a desired degree, then closed to maintain pressure therein. When bellows 16a and 16b are to be contracted, bleed valve 55 may be opened and, if desired, magnetic drive pump 52 reversed. Magnetic drive pump 52 is thus configured to pump borehole fluid 12 through supply conduit 34a for inflation and deflation of metal bellows 16a and 16b of sensor module 8. Top cavity 48 contains electronic controls 56 for driving and controlling magnetic drive pump 52. Electronic controls 56 are hermetically sealed within top cavity 50 by closing off that portion of housing 46 with a barrier wall 58. Communication between magnetic drive pump 52 and electronic controls 56 is provided by sealed, pressure-tight wire feeds 60 which pass through barrier wall 58 and carry drive power and any other electronic signals, for instance, from associated encoders or tachometers (not shown) that may be used to monitor pump performance.

Figure 5:
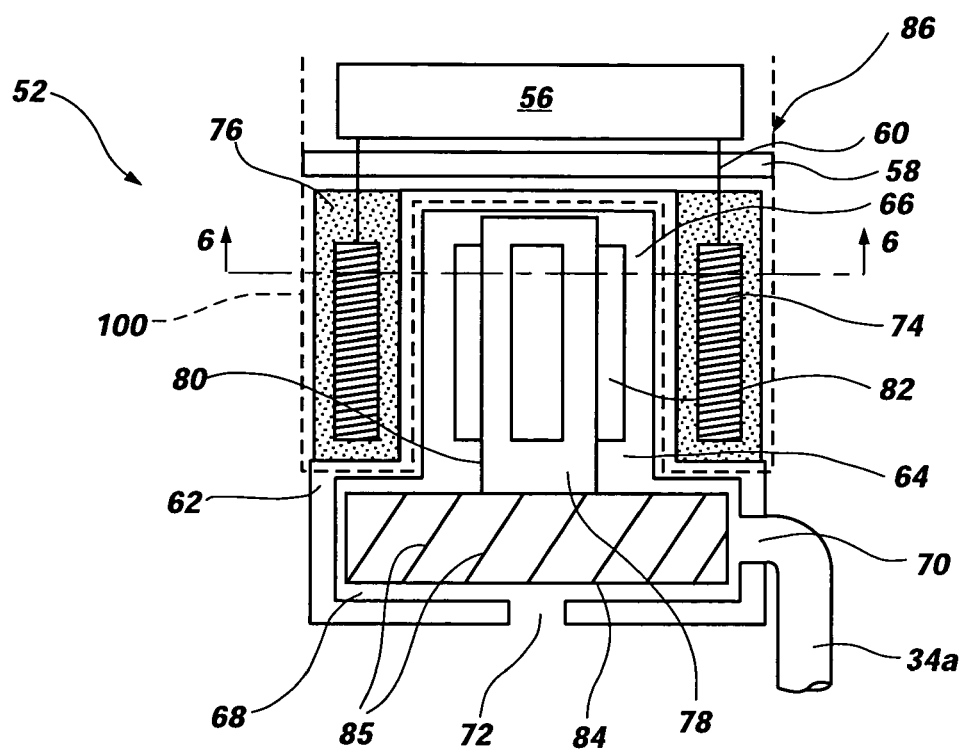
FIG. 5 is a schematic cross-sectional side view of an exemplary magnetic drive pump employed in the pump module of FIG. 4.
Figure 6:
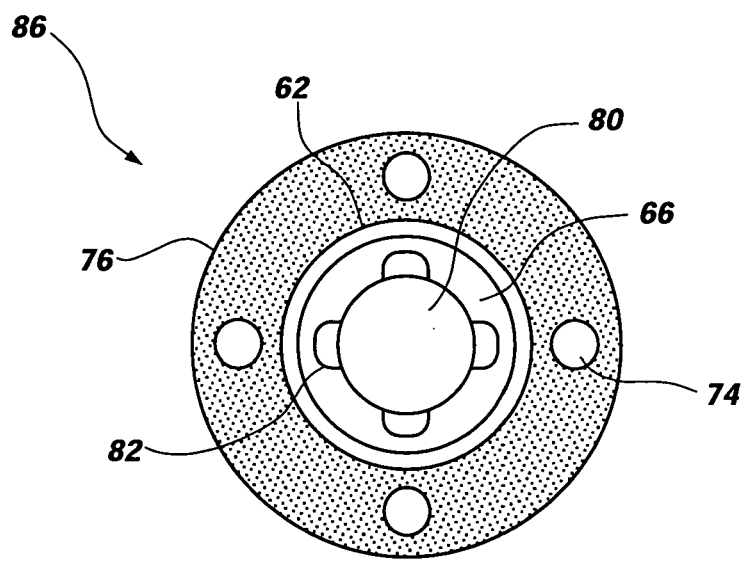
FIG. 6 is a transverse cross-sectional view of the magnetic drive pump of FIG. 5.

FIGS. 5 and 6 show an exemplary arrangement for magnetic drive pump 52 to illustrate a novel structure and method of operation as compared to conventional magnetic drive pumps. In the sectional side view depicted in FIG. 5, magnetic drive pump 52 comprises a pump housing or static shell 62 defining a chamber 64 having an armature portion 66 and an impeller portion 68. Static shell 62 further includes first passageway 70 for communication with supply conduit 34a and second passageway 72 for accessing the borehole fluid 12 filling bottom cavity 50. A ring of electromagnetic coils 74 surrounds static shell 62 along the armature portion 66 of chamber 64. Each of the electromagnetic coils 74 is connected to a wire feed 60. As shown in FIG. 5, electromagnetic coils 74 are encased in a plastic sheath 76 which insulates them from the borehole fluid that fills bottom cavity 48. Plastic sheath 76 is only exemplary, and it is possible that other insulation materials for electromagnetic coils 74 could be used as well. For instance, based on borehole fluid composition, it is possible that electromagnetic coils 74 might simply be insulated by packing them in grease and providing a pressure balancing mechanism to pressurize them to a pressure substantially equal to the hydrostatic borehole fluid pressure, as known in the art. Further, and as shown in broken lines 100, electromagnetic coils 74 encased in plastic sheath 76 for environmental protection and shock-resistance may be contained in an annular, downwardly extending portion of a sealed pressure-tight chamber within top cavity 48 common with electronic controls 56 and thus be completely removed from fluid pressure in the surrounding borehole, such an arrangement also eliminating the requirement that wire feeds 60 be sealed and pressure-tight. In such a case, only power and control conductors in communication with wireline 6 would require a sealed, pressure-tight feed through the wall of the pressure-tight chamber. Still further, the pressure-tight chamber may be filled with a substantially incompressible fluid such as a high temperature oil to lessen the pressure integrity requirements for the chamber walls.

Chamber 64 of static shell 62 contains a rotor assembly 78. Rotor assembly 78 includes a permanent magnet armature 80 having a number of permanent magnets 82 attached around its circumference, and an impeller 84 having blades 85 disposed circumferentially thereabout. FIG. 5 shows permanent magnet armature 80 is positioned within the armature portion 66 of chamber 64, while impeller 84 is positioned within the impeller portion 68 of chamber 64. While rotor assembly 78 may be mounted within chamber 64 through a suitable bearing structure, such as is known in the art and is therefore omitted for clarity in describing the present invention. Alternatively, the rotor assembly 78 may be bearingless and free-floating within chamber 64, for simplicity. The configuration of electronic controls 56, electromagnetic coils 74 and permanent magnet armature 80 with respect to static shell 62 as described and illustrated thus provides a durable magnetic drive motor 86 for driving impeller 84 of magnetic drive pump 52.

FIG. 6 is a cross-sectional view taken along line 6—6 of FIG. 5 that more clearly shows the basic operation of magnetic drive motor 86 in conjunction with magnetic drive pump 52. Permanent magnet armature 80 is positioned within armature portion 66 of chamber 64 such that it is centered within the ring of electromagnetic coils 74 surrounding static shell 62. Static shell 62 is formed of a material that is transparent to magnetic field emissions such as an austenite stainless steel or other non-magnetic metal. Other materials such as reinforced plastic, a composite material or ceramic may be used as well, as long as they allow passage of a magnetic field therethrough and are sufficiently durable in terms of the operating environment. In this manner, permanent magnets 82 disposed around the circumference of permanent magnet armature 80 may be acted on by magnetic fields generated with electromagnetic coils 74 in order to provide driving force. Remotely located electronic controls 56 fire electromagnetic coils 74 in a sequential or orbital manner as known in the art via wire feeds 60 thereby causing permanent magnetic armature 80 and attached impeller 84 to rotate. By varying the direction, speed and power of the firing sequence, electronic controls 56 may control the volume and direction of fluid flow within magnetic drive pump 52 as driven by impeller 84.

Returning to FIG. 5, the depicted arrangement allows fluid passing through magnetic drive pump 52 to freely communicate between armature portion 66 and impeller portion 68 of chamber 64. Accordingly, permanent magnet armature of magnetic drive motor 86 and impeller 84 will be maintained at a substantially equal pressure, eliminating the sealing and changing fluid dynamics problems associated with prior art pump motors in high pressure environments. Furthermore, by locating the electronic controls 56 for powering magnetic drive motor 86 within the separate hermetically sealed top cavity 50, only the electromagnetic coils 74 and permanent magnet armature 80 are exposed to environmental conditions. The durable nature of these components allows them to easily resist environmental conditions that may be encountered within a borehole. As noted above, it is also possible to completely remove electromagnetic coils 74 from the hostile downhole environment.

Figure 7:
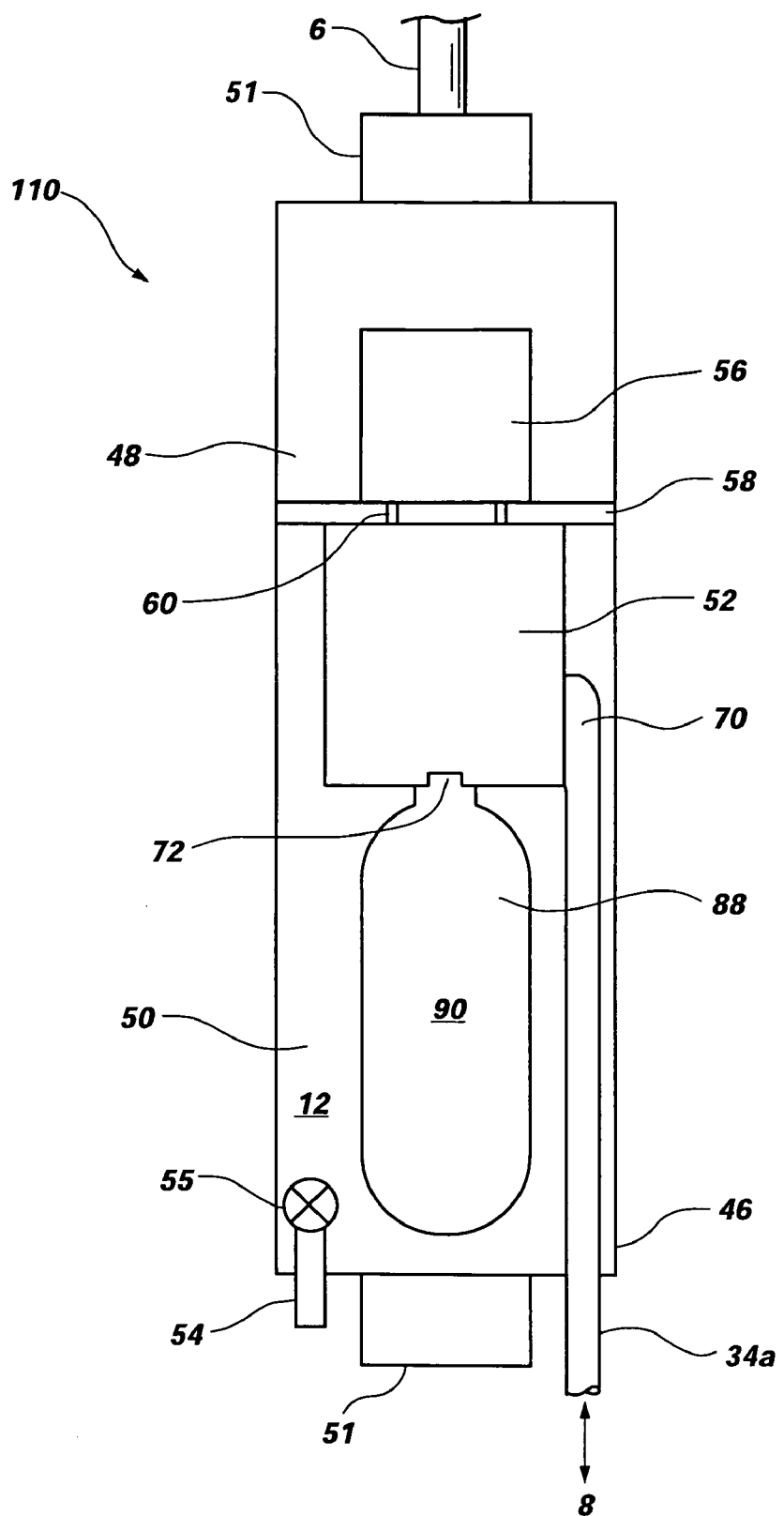
FIG. 7 is a schematic cross-sectional side view of an another exemplary pump module according to the present invention.

In certain situations where borehole fluid 12 is corrosive or contains particulate matter likely to damage or impair the operation of the rotor assembly 78, it may be desirable to use an alternative fluid for inflating metal bellows 16a and 16b. FIG. 7 shows another embodiment of a pump module 110 that is suitable for this purpose. Common elements between pump module 10 and pump module 110 are indicated with like reference numerals. Lower cavity 50 of pump module 110 includes an expandable fluid reservoir 88 for containing a bellows inflation fluid 90. Bellows inflation fluid 90 may be of any composition that is appropriate for inflating metal bellows 16a and 16b within given ambient borehole conditions and that is not reactive or damaging to pumping components. Under typical borehole conditions, for instance, plain water or water with an antifreeze additive to raise its boiling point would suffice for pumping fluid 90. Alternatively, a high temperature-tolerant oil may be used. Expandable fluid reservoir 88 may comprise a reinforced bladder of an elastomeric material such as those described for use with prior art bladders, but may also be formed of a metal bellows similar to metal bellows 16a and 16b in sensor module 8 and of suitable internal volume. This would be desirable, for example, if pump module 110 were located on sensor array 2 at a deep borehole position and subjected to the same high pressure and temperature conditions of concern with regards to sensor module 8.

As with pump module 10, lower cavity 5 of pump module 110 includes intake conduit 54 which terminates outside of housing 46 and provides a passageway for filling bottom cavity 50 with borehole fluid 12. In pump module 110, however, borehole fluid 12 is not taken in by magnetic drive pump 52, but is instead used to equalize the pressure of bellows inflation fluid 90 within expandable fluid reservoir 88 to the ambient pressure level in the borehole so that the head required to be provided by magnetic drive pump 52 to inflate metal bellows 16 is greatly reduced. As bellows inflation fluid 90 is drawn into or out of magnetic drive pump 52, expandable fluid reservoir 88 will expand or collapse within borehole fluid 12 to maintain pressure equilibrium. Bellows inflation fluid 90 may then be passed through magnetic drive pump 52 under ambient pressure without concern for damage due to corrosion or particulate matter. As with pump module 10, bleed valve 55 may be included with intake conduit 54 so that pressure may be maintained in metal bellows 16 after inflation thereof without operation of magnetic pump drive 52 by closing of bleed valve 55, and opening thereof as desired to deflate metal bellows 16.

To illustrate the interaction of the above described embodiments of the present invention, and referring to FIGS. 1, 2, 4 and 7, an exemplary borehole deployment is described as follows. Sensor array 2 carrying sensor modules 8 and a pump module 10 or 110 on wireline 6 is lowered into borehole 4. Once sensor module 8 is positioned at a desired sensing location within borehole 4, electronic controls 56 activate magnetic drive pump 52 to force fluid through conduits 34a and 34b, thereby inflating metal bellows 16a and 16b. If using pump module 10, the fluid will comprise borehole fluid 12 drawn in from the surrounding borehole 4. If using pump module 110, the fluid will comprise bellows inflation fluid 90 contained within expandable fluid reservoir 88. Bellows shoe 20 is expanded to extend outwardly until sensor module 8 is firmly clamped between borehole wall surfaces 22 and 32, effectively coupling triaxial geophone 24 for sensing seismic waves 1. At this point, magnetic drive pump 52 is stopped and the fluid pressure within metal bellows 16a and 16b is held constant, such as by closure of bleed valve 55 by electronic controls 56. Upon completion of seismic sensing at a given depth, bleed valve 55 is opened by electronic controls 56, which also may be used to reverse the rotation of magnetic drive pump 52 to pull fluid back through conduits 34a and 34b. Metal bellows 16a and 16b return to their deflated state, unclamping sensor module 8. Sensor array 2 is then free to be withdrawn from borehole 4, or may be moved to another sensing position.

As an additional matter, it is noted that while magnetic drive motor 86 has been presented in terms of magnetic drive pump 52, its durability due to the separate sealing of electronic controls 56 from the rest of the assembly makes it highly suitable for other extreme environment applications where a motor might be required. For instance, rather than rotating permanent magnet armature 80, it is conceivable that the location and firing sequence of electromagnetic coils 74 may be configured to move permanent magnet armature 80 in an off-center rotation such that magnetic drive motor 86 acts as an orbital vibrator. As seen in FIG. 1 and by way of example only, magnetic drive motor 86 might be included in emitter 92 to generate vibrations used as the source of seismic waves 1. In such an instance, emitter 92 may be clamped to the borehole wall in accordance with the present invention, or used to generate waves through the boreholed fluid. Emitter 92 may also be used to implement the known process of borehole telemetry, wherein magnetic drive motor 86 may be used to selectively drive an impeller to create pressure pulses within borehole fluid 12 to transmit data gathered from sensor modules 8 to the surface.

The above illustrated embodiments of the present invention provide a method and apparatus for coupling seismic sensors to a borehole wall suitable for high temperature and pressure environments. Although the present invention has been depicted and described with respect to the illustrated embodiments, various additions, deletions and modifications are contemplated without departing from its scope or essential characteristics. For instance, sensor module 8 might be configured to have a different number of metal bellows 16 for extending and coupling a seismic sensor, and bellows associated with more than one bellows shoe. Furthermore, a single pump module 10 or 110 may be connected to supply fluid to multiple sensor modules 8, the ratio of pump modules 10 or 110 to sensor modules 8 depending upon factors such as the pumping capacity of magnetic drive pump 52 and the desired fluid pressure for inflation of metal bellows 16*a* and 16*b*. The scope of the invention is, therefore, indicated by the appended claims rather than the foregoing description. All changes which come within the meaning and range of equivalency of the claims are to be embraced within their scope.

What is claimed is:

1. An apparatus for pumping fluid within a borehole, comprising:
    a housing;
    a barrier wall dividing an interior of the housing into a first cavity and a second cavity, wherein the second cavity is hermetically sealed;
    a laterally extendable sensor coupled with an inflatable bellows
    a rotor assembly comprising an armature rotatably mounted within the first cavity, carrying at least one permanent magnet and having an impeller secured thereto;
    a plurality of electromagnetic coils disposed circumferentially about the armature;
    a static shell substantially disposed about the rotor assembly, wherein a portion of the static shell is disposed between the electromagnetic coils and the armature, and wherein the static shell defines a common volume about the armature and the impeller such that fluid may flow within the common volume about both the armature and the impeller; and
    electronic controls contained within the second cavity and configured to fire the electromagnetic coils in an orbital manner.

2. The apparatus of claim 1, further comprising at least sealed wire feed coupled between the electronic controls and the plurality of electromagnetic coils.

3. The apparatus of claim 1, wherein the static shell comprises a material substantially transparent to magnetic field emissions.

4. The apparatus of claim 3, wherein the static shell comprises austenite stainless steel.

5. The apparatus of claim 1, further comprising an inlet from the exterior of the housing into the first cavity.

6. The apparatus of claim 5, wherein the inlet further comprises a selectively closeable valve.

7. The apparatus of claim 5, wherein the common volume defined by the static shell is in communication with the first cavity.

8. The apparatus according to claim 5, further comprising an expandable fluid reservoir contained within the first cavity of the housing, wherein an inlet is defined in the static shell at a location adjacent the impeller and wherein the inlet is coupled with the expandable fluid reservoir.

9. The apparatus of claim 8, wherein the inlet further comprises a selectively closeable valve.

10. The apparatus of claim 1, further comprising a supply conduit having a first end in communication with the common volume defined by the static shell at a location adjacent the impeller, the supply conduit also having a second end extending to a remote location exterior to the housing.

11. The apparatus of claim 1, wherein the plurality of electromagnetic coils are disposed within the first cavity.

* * * * *